J. DEUEL.
Horse Hay-Rake.
No. 203,601. Patented May 14, 1878.
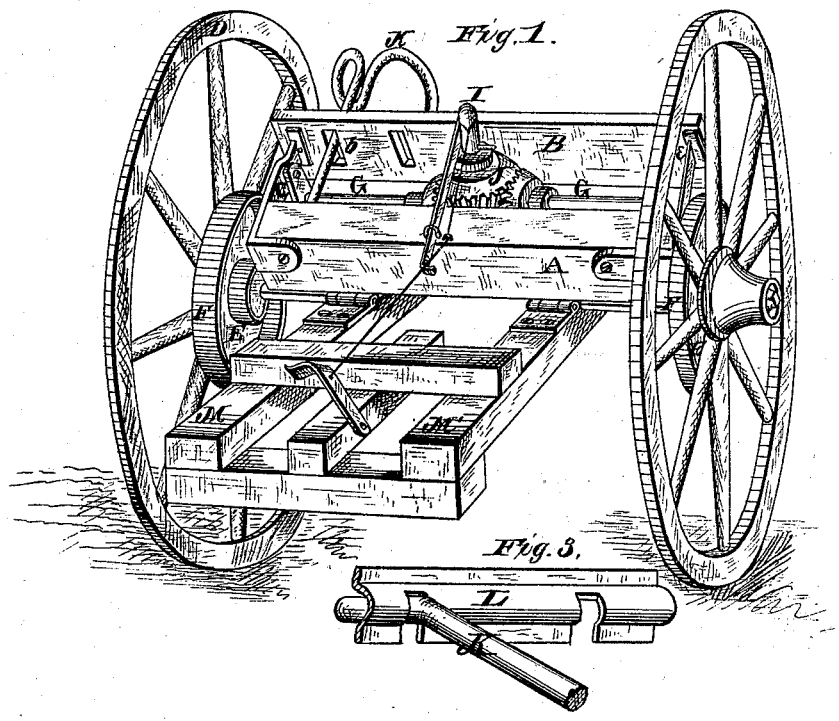
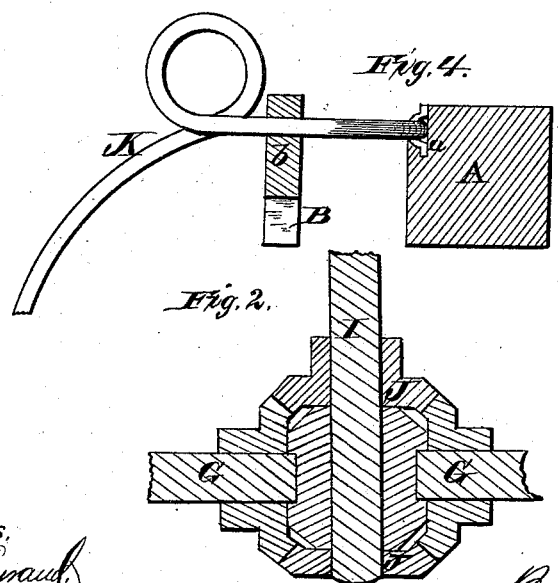

UNITED STATES PATENT OFFICE.

JACOB DEUEL, OF MILLBROOK, ASSIGNOR TO WILLIAM H. FIELD, OF PORT CHESTER, NEW YORK.

IMPROVEMENT IN HORSE HAY-RAKES.

Specification forming part of Letters Patent No. 203,601, dated May 14, 1878; application filed November 27, 1877.

*To all whom it may concern:*

Be it known that I, JACOB DEUEL, of Millbrook, in the county of Dutchess and State of New York, have invented a new and useful Improvement in Horse Hay-Rakes; and I do hereby declare that the following is a full, clear, and exact description thereof, reference being had to the accompanying drawings, making part of this specification, in which—

Figure 1 is a perspective view of the rake. Fig. 2 is a vertical section, showing the equalizer. Fig. 3 is a perspective view of a detached portion of the tooth-holder. Fig. 4 is a view showing the rake-head and attachments in vertical section, this section being taken in the line $x\ x$, Fig. 1.

My invention relates to that class of horse-rakes in which the gathered hay is discharged by the draft or power of the team at the will of the operator; and it consists in certain improved details of construction, which I will now proceed to describe, and point out particularly in the claims.

In the accompanying drawing, A represents the head of the rake, to which the tooth-board B is securely fastened by means of the supporting-arms $c$, which are secured to the head A. M M' are the thills. D D are the ordinary supporting-wheels of the rake, to which the friction-drums E E are rigidly secured. These drums E E are encircled by friction-bands F F, which are caused to bite the drums E E by means of rock-shafts G G and lifting-toes, which are constructed and supported at their outer ends in a manner similar to those shown in patent granted to Wm. J. Lane and Wm. H. Field, March 21, 1876, No. 174,912.

I provide separate rock-shafts for the two bands, in order that they may be independent in their action, experience having shown that with one continuous rock-shaft having lifting-toes on each end it is practically impossible to regulate the force applied to either band at will. By having independent rock-shafts I am enabled to apply the force at either band, or both, if desired.

The rock-shafts are divided, preferably, at or near the center of the length of the rake-head, and are provided with suitable supports from the head A.

Upon or near the ends of the rock-shafts G G are secured miter-gears, having their faces toward each other, and between them, fitted loosely upon a vertical shaft, I, are preferably two more miter-gears, J J, although one will answer the same purpose, which, engaging with the two first mentioned, serve to form an equalizer.

It is manifest that, if the rock-shafts G G are caused to rotate by means of force applied to the shaft I, the power transmitted through each rock-shaft will be equal, and that either friction-brake can adapt itself to the irregularities of form of the surface against which it may be applied independently of the other brake, the only condition being that the torsional strain applied to the shafts G G will be equal.

I claim—

1. In a horse hay-rake, the combination of a rake-head supported by the main wheels or axle, two friction brakes or clutches at or near the ends of the rake-head for lifting the latter by the power of the team when required, and a rocking-shaft constructed in two parts, connected together by an automatical equalizing device, for the purpose of applying the friction brakes or clutches with substantially equal power.

2. The combination of lever I, gears J J, rock-shafts G G, and friction-brakes, when arranged substantially as and for the purpose described.

JACOB DEUEL.

Witnesses:
  JOSEPH DUBOIS,
  JOHN R. HORTON.